United States Patent [19]
Doughty et al.

[11] 3,802,823
[45] Apr. 9, 1974

[54] DUAL EXTRUDER RADIAL WHEEL MOLD

[75] Inventors: Robert L. Doughty, West Hartford; William W. Mumford, Jr., Manchester, both of Conn.

[73] Assignee: Monsanto Company, St. Louis, Mo.

[22] Filed: Jan. 20, 1972

[21] Appl. No.: 219,287

[52] U.S. Cl. 425/326 B, 425/387 B, 425/DIG. 206, 425/DIG. 211
[51] Int. Cl. B29d 23/03
[58] Field of Search........... 425/DIG. 211, DIG. 206, 425/342, 326 B, DIG. 203, DIG. 205, 387 B; 264/99

[56] References Cited
UNITED STATES PATENTS

| 2,674,006 | 4/1954 | Bailey et al. | 425/DIG. 206 |
| 2,784,452 | 3/1957 | Ruekberg et al. | 425/DIG. 211 |
| 3,019,481 | 2/1962 | Negoro | 425/326 B |
| 3,543,339 | 12/1970 | Stefanicik | 425/154 |
| 3,555,598 | 1/1971 | Mehnert | 425/DIG. 205 |
| 3,583,031 | 6/1971 | Kader et al. | 425/326 B |
| 3,596,315 | 8/1971 | Yoshikawa et al. | 425/DIG. 211 |
| 3,599,284 | 8/1971 | Osa et al. | 425/326 B |

*Primary Examiner*—Richard B. Lazarus
*Attorney, Agent, or Firm*—Michael J. Murphy

[57] ABSTRACT

A vertical rotary blow molding apparatus of significantly increased capacity affected by dual cavity molds where one of the cavities extends forward of the plane of rotation of the wheel and the other cavity extends rearward thereof, and where each of said cavities is fed by a separate extruder.

7 Claims, 4 Drawing Figures

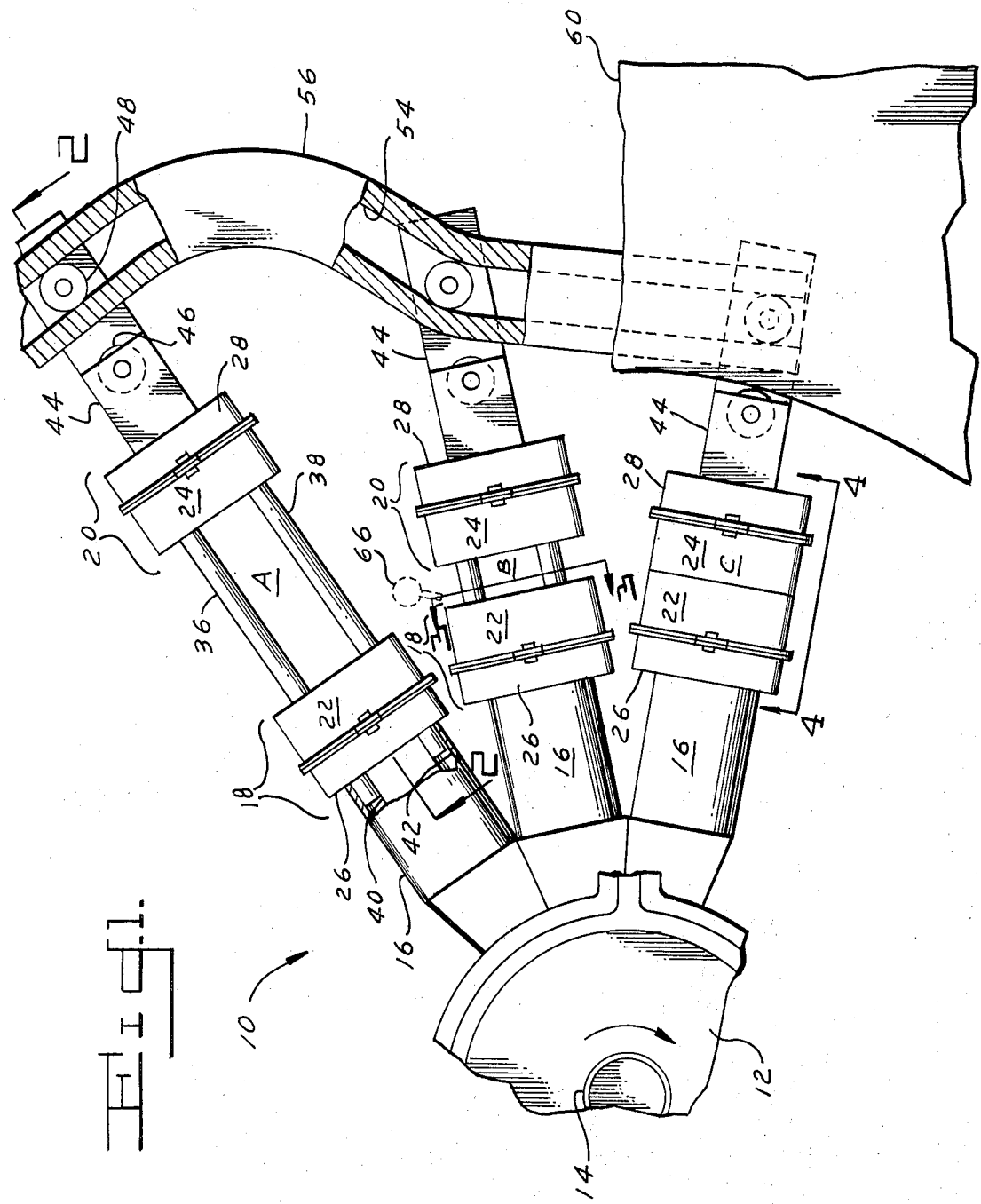

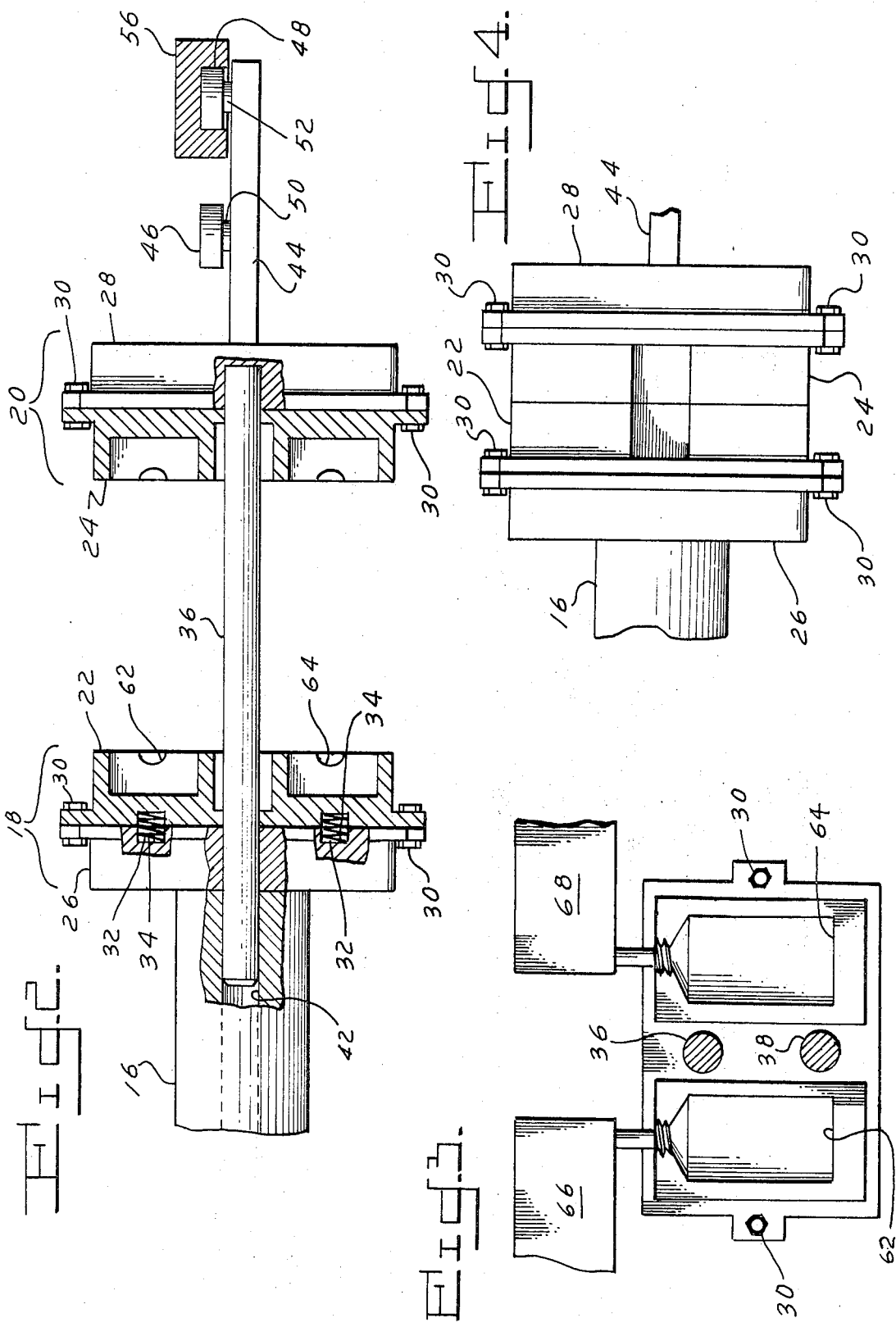

1

DUAL EXTRUDER RADIAL WHEEL MOLD

BACKGROUND

This invention relates to vertical rotary blow mold machines of the type exemplified in U. S. Pat. No. 2,784,453 to Herbert S. Ruekberg et al. Such apparatus comprises a spoked mold wheel mounted for rotation on a horizontal shaft. The mold assemblies of the wheel are carried on the spokes or arms thereof and the mold halves forming said assemblies are slidable radially thereon so as to open and close as the wheel turns under the control of a radial cam track affixed to the frame of the apparatus. The actual operation of such apparatus is explained in detail in the aforementioned patent.

Since the introduction of rotary vertical blow molding machines for making bottles and the like from tubular sections of synthetic plastic material, there has been constant effort to improve the apparatus. In the main, these improvements have involved ways to refine the molding cycle so as to insure the shortest molding times and thus provide for the greatest capacity. While many such efforts in this regard were successful, the first significant capacity increasing improvement came about as a result of the employment of a double gob head on the feeding extruder for feeding side by side molds on a standard rotary apparatus. This, of course, doubled the capacity of the apparatus, but it also dictated that the rate of extrusion of the synthetic plastic likewise had to be increased. This presents problems with certain thermoplastics which are sensitive to a high rate of working and tend to break down in the extruder and/or supply head where the tube is formed.

Accordingly, it is the principal object of the present invention to provide means for significantly increasing the molding capacity of rotary molding apparatus with a minimum of costs.

A further object of the present invention is to provide a dual cavity mold assembly for a rotary blow mold machine where each cavity is fed by a separate extruder.

A further object of the present invention is to provide a rotary blow mold apparatus of significantly increased capacity affected by dual cavity molds and dual extruders wherein feed rates are equalized and mold size is as selective as in existing rotary blow molding.

The present invention attains the above objectives by the use of a standard vertical rotary blow molding wheel wherein the spokes or arms carry a unique dual cavity mold set-up. One of said mold cavities extends forward of the plane of rotation of the wheel, while the other of said mold cavities extends to the rear of the plane of rotation of the wheel. With this novel mold arrangement two extruders, i.e., one for filling each cavity, may be used, one forward of the plane of rotation of the wheel and one to the rear thereof.

The foregoing and other objects and advantages and details of the present invention will be more readily understood from the following description with reference to the drawings, in which:

FIG. 1 is a partial schematic, fragmentary front elevation view of a rotary blow molding apparatus embodying the present invention;

FIG. 2 is a section view having parts broken away, taken along the line 2—2 of FIG. 1;

FIG. 3 is a view taken along the line 3—3 of FIG. 1 of a mold half schematically depicting the extruder feeds; and FIG. 4 is a view taken along the line 4—4 of FIG. 1, showing the dual cavity mold assembly of the present invention in its closed position.

The basic construction of the apparatus, except as otherwise hereinafter shown and described, is much like the apparatus described in the previously mentioned Ruekberg et al. patent.

Referring to FIG. 1, it will be seen that the wheel 10 is mounted on a hub 12 for rotation with the horizontal shaft or axis 14. The shaft 14 may be powered by any suitable means (not shown). A plurality of arms or spokes 16, three of which are shown, i.e., A, B and C, are affixed to the hub 12 and extend radially outward therefrom.

As depicted in FIGS. 1, 2 and 4, the arms 16 of the wheel 10 further comprise a mold assembly having an inner stationary mold half or section 18 and an outer movable mold half or section 20. Both mold halves are comprised of dual cavity molds 22 and 24 and mold support blocks 26 and 28. As is illustrated best in FIGS. 2 and 3, the molds 22 and 24 are affixed to the mold support blocks 26 and 28 respectively by bolts 30 or any suitable fastener. In addition, the inner mold is provided with biasing means, such as springs 32, at the interface of the mold 22 and its support block 26. As shown, the springs are recessed in holes 34 in the mold 22 and the block 26. Such loading is used to absorb and dissipate mold closing shock and the like.

A pair of rods 36 and 38 are provided for guiding and supporting the travel of the outer mold assembly 20 relative to the inner mold assembly 18. As clearly shown in FIG. 2, one end of the rods 36 and 38 is affixed to the outer mold support block 28 and is movable therewith. The rods pass through the center of the outer mold half 24 through clearance holes therein, through additional clearance holes in the inner mold half 22 and its support block 26 into holes 40 and 42 in the arm 16 which slidably receives said rods.

An actuator plate 44 is affixed to the outer side of mold support block 28. As shown in FIGS. 1 and 2, a pair of rollers 46 and 48 are rotatably mounted on pins 50 and 52 which are affixed to the plate 44. The outer roller 48 is in rolling contact with a slot 54 in rail or track 56. The inner roller 58 is positioned on plate 44 for rolling contact with profile plate 60. As will be clear to those skilled in the art, the rail or track 56 and profile plate 60 act as camming means for opening and closing the mold assemblies 18 and 20.

With reference to FIGS. 1 and 3, one will easily note the relationship between the dual cavity molds and the feeding extruders. As shown, mold half 22 is provided with two side by side mold cavities 62 and 64. In relation to the plane of rotation of the wheel 10, it will be noted that mold cavity 62 is forward thereof while mold cavity 64 is rearward thereof. Forward mold cavity 62 is fed by a conventional extruder 66 of suitable type having a crosshead for extruding in a vertical direction, preferably downward. The rear mold cavity 64 is fed by an additional extruder 68 of the conventional type also fitted with a crosshead. As should be clear, the extruders 66 and 68 are in line opposite each other on either side of the wheel 10 perpendicular to the plane of rotation thereof. This extruder positioning is schematically shown for one extruder in phantom in FIG. 1.

As in conventional vertical rotary blow mold apparatus each mold 22 and 24 may be provided with additional mold cavities, e.g., above and/or below cavities 62 and 64, or adjacent cavities 62 and 64. In the latter instance, each of the extruders 66 and 68 would in turn be provided with a double gob head.

What we claim is:

1. In a vertical rotary blow molding apparatus having a rotary wheel and mold assemblies thereon formed of inner and outer mold sections radially movable relative to one another, the improvement which comprises a dual cavity mold formed by said inner and outer mold sections and dual extrusion means including dual extruders, one of said extruders for feeding each of said cavities in said dual cavity mold.

2. The vertical rotary blow molding apparatus of claim 1 wherein one cavity of said dual cavity mold is positioned forward of the plane of rotation of said wheel and the other cavity is positioned rearward of the plane of rotation.

3. The vertical rotary blow molding apparatus of claim 2 wherein said dual extrusion means are in line on either side of said wheel and perpendicular to the plane of rotation thereof.

4. In a vertical rotary blow molding apparatus having a rotary wheel and mold assemblies thereon formed of inner and outer mold halves radially movable relative to one another, the improvement which comprises each of said mold assemblies having two mold cavities formed therein, one of said mold cavities being positioned forward of the plane of rotation of said rotary wheel and the other of said mold cavities being positioned rearward of said plane of rotation and dual extrusion means including dual, separate extruders said forward mold cavity and said rearward mold cavity each being fed by one of said separate extruders.

5. In a vertical rotary blow molding apparatus having a rotary wheel and mold assemblies thereon formed of a stationary mold section and a movable mold section, said sections being radially movable in relation to one another, the improvement which comprises a pair of guide and support rods affixed to one of said mold sections and slidably received by the other of said mold sections, said rods being positioned in a plane substantially parallel to the plane of rotation of said wheel, a pair of mold cavities formed by said inner and outer mold sections and dual extrusion means including dual extruders, one of said extrusion means for feeding each of said cavities.

6. The vertical rotary blow molding apparatus of claim 5 wherein one of said pairs of mold cavities is positioned forward of said pair of rods and the other of said mold cavities is positioned rearward thereof.

7. The vertical rotary blow molding apparatus of claim 5 wherein said rods are affixed to said movable mold section and slidably received by said stationary mold section.

* * * * *